United States Patent [19]

Chung

[11] Patent Number: 4,682,308
[45] Date of Patent: Jul. 21, 1987

[54] ROD-TYPE MULTIPOLE SOURCE FOR ACOUSTIC WELL LOGGING

[75] Inventor: Jing-Yau Chung, Houston, Tex.

[73] Assignee: Exxon Production Research Company, Houston, Tex.

[21] Appl. No.: 607,340

[22] Filed: May 4, 1984

[51] Int. Cl.$^4$ .................... G01V 1/00; H04R 17/00
[52] U.S. Cl. ..................................... 367/31; 367/75;
367/912; 181/106
[58] Field of Search ................... 367/31, 75, 912, 156,
367/168, 158, 163, 173, 174; 181/106, 110, 120;
310/26, 330; 29/602 A

[56] References Cited

U.S. PATENT DOCUMENTS

| | | | |
|---|---|---|---|
| 2,064,911 | 12/1936 | Hayes | 367/156 |
| 2,705,460 | 4/1955 | Burdick | 367/168 |
| 3,325,780 | 6/1967 | Horan | 310/330 |
| 3,470,402 | 9/1969 | Abbott | 310/26 |
| 3,593,255 | 7/1971 | White | 367/912 |
| 3,775,739 | 11/1973 | Vogel | 340/18 |
| 3,821,740 | 6/1974 | Ehrlich | 367/100 |
| 3,949,352 | 4/1976 | Vogel | 367/31 |
| 4,207,961 | 6/1980 | Kitsunezaki | 181/106 |
| 4,255,798 | 3/1981 | Havira | 367/32 |
| 4,319,345 | 3/1982 | Dennis | 367/25 |
| 4,383,591 | 5/1983 | Ogura | 181/106 |
| 4,443,731 | 4/1984 | Butler et al. | 310/26 |

FOREIGN PATENT DOCUMENTS

| | | |
|---|---|---|
| 031989 | 7/1981 | European Pat. Off. . |
| 83/0024 | 4/1983 | South Africa . |
| 83/0043 | 7/1983 | South Africa . |
| 83/2678 | 12/1983 | South Africa . |
| 83/4368 | 3/1984 | South Africa . |
| 1193381 | 5/1970 | United Kingdom . |
| 1193382 | 5/1970 | United Kingdom . |
| 1193383 | 5/1970 | United Kingdom . |

OTHER PUBLICATIONS

Lanotte et al, "Vibrational Modes, Elastic Stiffness, and Piezomagnetic Strain of a Magnetized Rod", Jan. 17, 1983, J. Appl. Phys. vol. 54, No. 8.
Chang, "A High-Temperature Prototype Instrument for Downhole Acoustic Sensing", Sep. 19, 1983, IEEE Trans. Geosci. & Remote Sensing, vol. GE-22, No. 6.
Winbow, G. A., "How to Separate Compressional and Shear Arrivals in a Sonic Log," 50th Annual International Meeting of the Society of Exploration Geophysicists, Houston, Texas, Nov. 17-20, 1980.

Primary Examiner—Thomas H. Tarcza
Assistant Examiner—Daniel T. Pihulic
Attorney, Agent, or Firm—Alfred A. Equitz

[57] ABSTRACT

Method and apparatus for acoustic wave generation and transmission into a subsurface earth formation, particularly adapted for use in borehole shear wave logging. A logging sonde adapted to be suspended in a borehole traversing a formation houses a source of acoustic waves. The source simultaneously generates a plurality of acoustic waves propagating generally radially outward from locations within the sonde housing adjacent the vertical central axis thereof and will interfere to produce multipole acoustic waves in the formation. Detector means within the housing spaced longitudinally from the source detect acoustic energy in the formation resulting from the generated waves. In a preferred embodiment, the source includes a cross-shaped rod assembly comprised of two rods perpendicular to each other and joined at their mid-points through which the central axis passes. The rods lie in a plane perpendicular to the central axis and are preferably each comprised of a different magnetostrictive material such that the strain constant of the rods differ in sign. Ends of each rod have a respective acoustic radiator attached thereto facing radially outward. Upon electrical excitation of the rods, they may be caused to vibrate along their respective longitudinal axes substantially 180° out of phase with respect to each other. Vibration of the reflectors of the first and second rods, in response thereto, set up respective first and second pairs of acoustic waves also out of phase with respect to each other which propagate from the radiators into the formation, where they interfere to produce the desired quadrupole acoustic wave.

27 Claims, 11 Drawing Figures

ROD-TYPE MULTIPOLE SOURCE FOR ACOUSTIC WELL LOGGING

CROSS-REFERENCES TO RELATED APPLICATIONS

U.S. patent application Ser. Nos. 525,910 filed Aug. 24, 1983 by Winbow and Baker; 440,140, filed Nov. 8, 1982 by Winbow, et al.; 395,449, filed July 6, 1982 by Winbow and Chen, which issued as U.S. Pat. No. 4,606,014 on Aug. 12, 1986; and 379,684, filed May 19, 1982 by Winbow, et al., all assigned to Exxon Production Research Company, relate to the general field of this invention.

BACKGROUND OF THE INVENTION

This invention relates to acoustic well logging in general and more particularly to methods and apparatus for generating and transmitting acoustic waves and transmitting them into a formation, such methods and apparatus being adapted particularly for use in borehole acoustic shear wave logging.

It has long been known in the investigation of subsurface earth formations traversed by a borehole that measurements or "logs" of acoustic energy introduced into the formation can yield extremely useful information about various formation parameters and characteristics. Accordingly, it has been conventional to introduce a logging sonde into the borehole containing some form of acoustic wave generator and receiver to direct acoustic energy from the generator into the formation adjacent the borehole elevation of interest, and to thereafter record with the receiver the resultant acoustic waves returning from the formation.

In such acoustic well logging techniques, several interrelated constraints combine to severely complicate the task of improving the design of acoustic wave generators or "sources".

First, the source desirably must be of a relatively small size for several reasons. For example, logging tools typically may only have a nominal outside diameter of 4" or the like. Moreover, although the constraint on vertical size of a source would not appear to be so severe, it is nevertheless desirable to also avoid undue length of a logging tool. This is due to the need to insure smooth passage of the sonde through the borehole (which often may be deviated) and the fact that the increasing complexity of downhole instrumentation puts all space within the logging tool at a premium.

Yet another constraint on the design of acoustic logging sources in some applications was that they must emit acoustic waves of a relatively low frequency and yet often of a high power, as, for example, in the case of direct shear wave logging in soft formations or in cross-borehole compressional wave logging.

Referring to shear wave logging in particular as but one example, measurement of the shear wave was often difficult to accomplish due to its relatively small amplitude relative to other "noise" (which may include compressional waves and the like as is well known in the art). Thus, it was frequently desirable to generate strong shear waves within the formation. This, in turn, meant that extremely powerful acoustic wave sources for setting up the shear waves were required, often of a low frequency as, for example, in the case of logging soft formations.

Both requirements of low frequency and high power in acoustic logging sources suggested taking advantage of the relatively larger longitudinal dimension of the sonde in the design of these sources. In particular, necessity to operate sources in the range of 3 KHz or lower with appreciable output power and the resultant lengths of resonating members required to achieve natural frequencies in this range suggested use of the sonde's longitudinal dimension.

However, as aforesaid, not only were source designs hampered by the necessity to restrict source widths (due to the limited diameter of the sonde), but it was further desirable to avoid unduly utilizing space within a sonde in the longitudinal direction.

Accordingly, an acoustic wave source was desired which was small in size (due to practical physical constraints of a logging sonde), yet relatively high in output power and low in its resonant frequency, and further adapted in particular to establish strong acoustic shear waves in the formation sufficient for direct shear wave logging in soft formations.

SUMMARY OF THE INVENTION

The methods and apparatus of the present invention are for the generation of acoustic multipole waves and the transmission thereof into a subsurface earth formation traversed by a borehole having a vertical central axis, such methods and apparatus being adapted particularly for use in borehole shear wave logging.

The apparatus of the present invention generally comprises a sonde adapted to be moved along the borehole which houses an acoustic wave source for generating acoustic pressure waves and transmitting them into the formation. The source includes at least one rod having opposing acoustic radiating end surfaces oriented to generally face radially outwards toward the formation.

The method of the present invention generally comprises electrically exciting the rod or rods whereby induced changes in length thereof cause the respective end surfaces to vibrate along the longitudinal axis of the respective rod, thereby, in turn, causing acoustic waves to propagate outwardly from the end surfaces and into the formation.

More particularly, in a preferred embodiment of the present invention the acoustic wave source includes first and second rods each extending longitudinally along respective first and second axes which are substantially perpendicular to each other and to the central axis. The rods are joined at their mid-points through which the central axis passes, and thereby define a cross-shaped configuration lying in a plane substantially perpendicular to the central axis. Each rod has a pair of opposing outer end surfaces facing the formation and lying along and intersected by their respective first or second axes.

Attached to each outer end surface of each rod is an acoustic radiator, the pair of acoustic radiators attached to ends of the first rod being referred to as the first radiators and those attached to the second rod ends being referred to as the second radiators. Each radiator has an outer surface intersected by its respective first or second axis which faces outward toward the formation. The first and second rods are comprised of first and second magnetostrictive materials, respectively, the first such material having a strain constant opposite in sign to that of the second material.

Electrical coils are disposed about the rods which, when appropriately energized, establish a periodically varying magnetic field in each rod, thereby causing the rod to vary in length in periodic fashion and in the direction of its respective first or second axis. This, in turn, causes the first and second radiators to generate respective acoustic pressure waves which propagate outwards from the four radiator surfaces in the direction of their respective first and second axes and thence out into the formation.

Due to the difference in sign between the magnetostrictive strain constants of the first and second rods, motion of the end surfaces of the rods constitutes a quadrupole motion, e.g., during a first time interval the end surfaces of the first rod will move toward each other while those of the second rod will move away from each other, and, during a second time interval, those of the first rod move away while the second rod end surfaces move towards each other. Accordingly, the acoustic waves introduced into the formation by the first radiators will be out of phase with respect to those introduced into the formation by the second radiators, so that the acoustic waves will interfere with each other in the formation to generate the desired quadrupole acoustic wave.

DETAILED DESCRIPTION OF THE PREFERRED EMBODIMENT

Figures 1, 5:
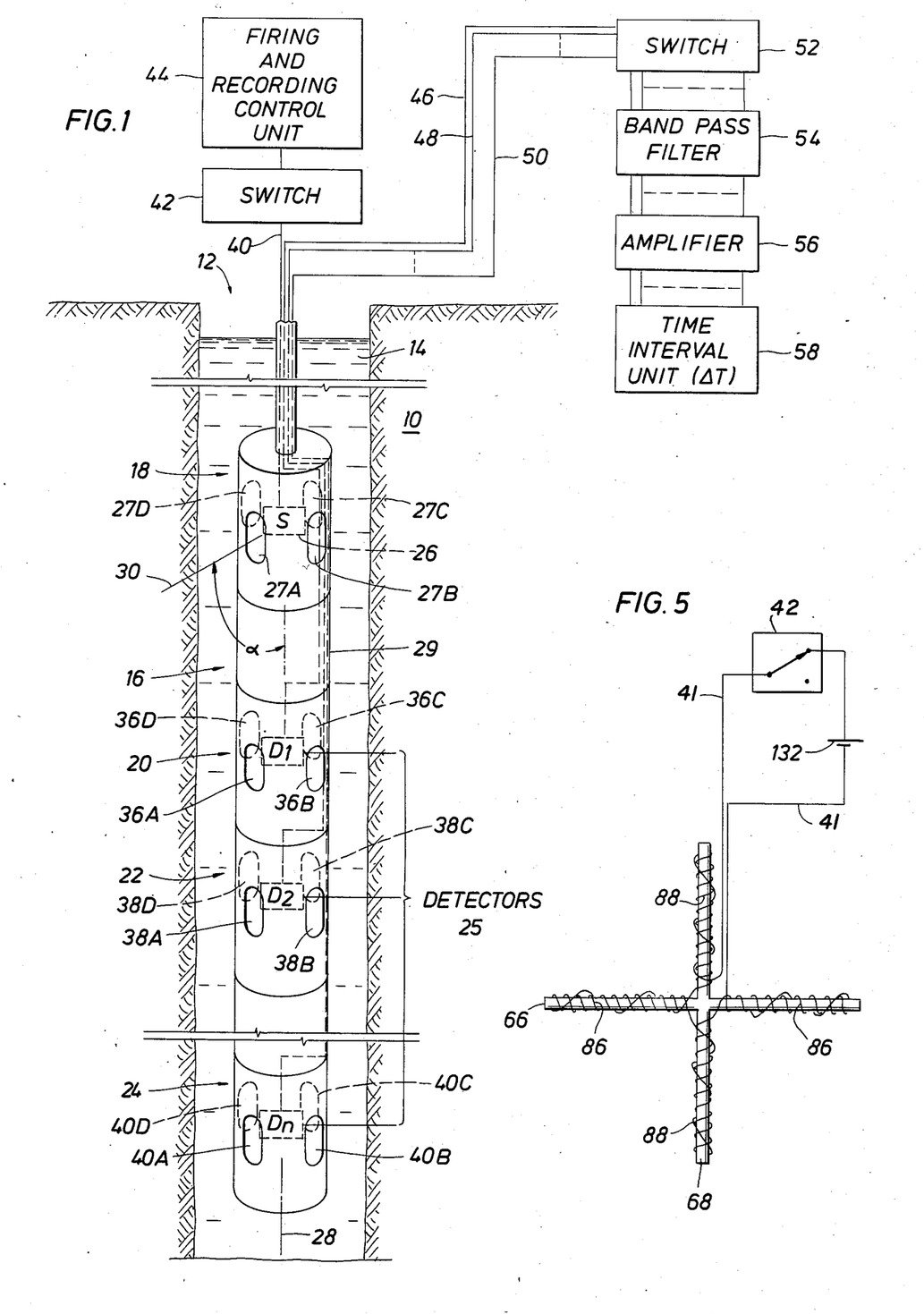
FIG. 1 is a pictorial view, partly schematic, depicting an acoustic logging system of the present invention.
FIG. 5 is a pictorial view of the rod elements and associated coils of the logging source of FIG. 2A illustrating schematically the electrical wiring thereof.

FIG. 1 is a pictorial view of an acoustic logging system of the present invention adapted particularly for use in acoustic shear wave logging in a subsurface earth formation traversed by a borehole. A subsurface formation 10 to be investigated is traversed by a well borehole 12 typically containing a fluid 14. Logging sonde 16 is provided which is adapted to be moved vertically along borehole 12 to the desired borehole elevation at which the formation is to be investigated.

The sonde 16 is conventionally of a sectional configuration, and may include an acoustic wave generating source section 18, and one or more acoustic wave detector sections such as sections 20, 22, and 24. Each detector section is provided with a corresponding detector $D_1$, $D_2$, and $D_n$, collectively referred to as detector array 25. Although three detectors are shown in FIG. 1, it should be recognized that detector array 25 may include any number of detectors.

Similarly, the source section 18 will house an acoustic source 26 of the present invention. It will be noted that the detector sections 20, 22, and 24 will typically be physically isolated from the source section 18 by a spacer section 29 in a manner well known in the art, and that sections 18-24 will further be coaxially aligned about a longitudinal central axis 28 to form the cylindrical sonde 16. When the sonde 16 is disposed within borehole 12, central axis 28 will be seen to also preferably approximate the axis of borehole 12.

A closer inspection of FIG. 1 reveals that sections 18-24 are each provided with a respective set of four acoustic windows 27A-D, 36A-D, 38A-D and 40A-D. Although each set of windows 27A-D, 36A-D, 38A-D, and 40A-D is shown in FIG. 1 to have four windows, it should be recognized that each set of windows may have more or less than four windows. In operation, source 26 will generate two or more acoustic compressional wave pulses (only one of which is depicted as pressure wave 30) in a manner to be hereinafter described in greater detail. Each wave 30 will exit its respective window such as window 27A at an angle, α, relative to central axis 28. Acoustic energy in wave 30 (and the other compressional waves generated by source 26) will traverse borehole fluid 14, enter the formation 10, and travel longitudinally downward whereupon it will re-enter fluid 14, pass through sets of windows 36A-D, 38A-D and 40A-D (and any other windows associated with other detectors of detector array 25), and be detected by detector array 25 also in a manner later described in more detail.

A firing and recording control unit 44 is used to control the energization of source 26 at appropriate desired times, functionally depicted by the presence of switch 42. Acoustic waveforms generated by detectors $D_1$-$D_n$ of array 25 in response to acoustic energy impinging thereupon from formation 10 will be delivered on respective signal lines 46, 48 and 50 (and other signal lines, not shown, from other detectors of detector array 25) to uphole circuitry 52, 54, 56, and 58 for processing, recording, display, and the like as desired.

More particularly, and as functionally depicted by switch 52, each signal on lines 46-50 will be selected and filtered by an appropriate band pass filter 54, amplified by amplifier 56, and then delivered to a time interval unit 58, all in a manner and for purposes well known in the art. Travel times of the acoustic energy from source 26 through formation 10 to detectors $D_1$-$D_n$ of array 25 may then be determined, from which velocity of acoustic waves in the formation 10 may be derived.

Figure 2A:
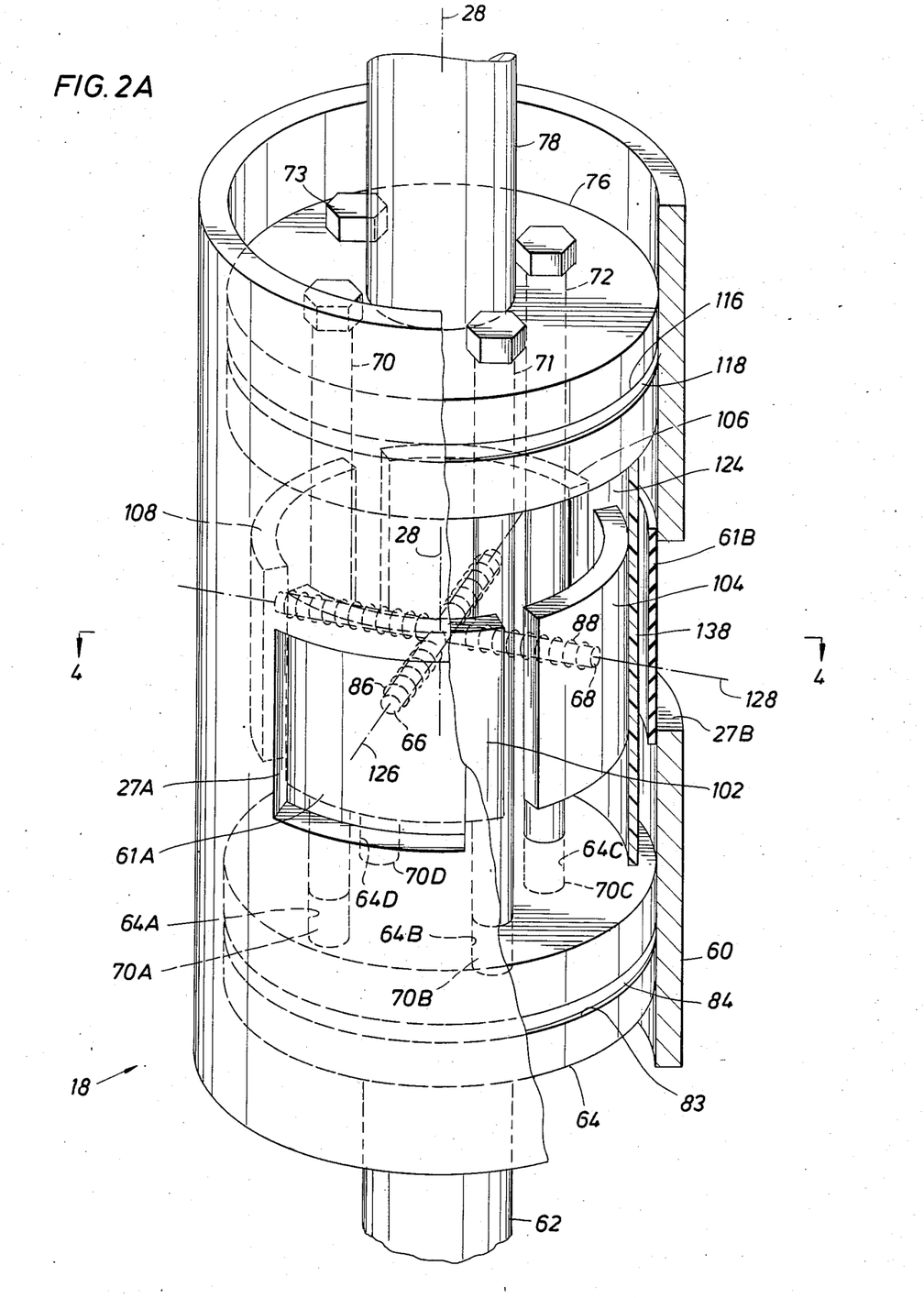
FIG. 2A is a pictorial view, partly in section, depicting a quadrupole shear wave logging source of the present invention, which is suitable for use in the system shown in FIG. 1.

FIG. 2A is a pictorial view depicting a preferred embodiment of a quadrupole shear wave logging source of the present invention suitable for use as source 26 illustrated in FIG. 1 and contained in section 18. The source shown in FIG. 2A comprises a hollow cylindrical housing 60 through which a lower support mandrel 62 passes which supports a disc-shaped base 64.

In the middle portion of housing 60 are windows 27A-D previously mentioned (only two of which are shown for clarity as windows 27A and 27B). Each of windows 27A-D comprises an aperture, extending across which is a respective thin membrane such as rubber sheeting 61A (or 61B with respect to window 27B) which is substantially acoustically transparent, whereby acoustic pulses generated internally of the housing 60 may be transmitted through the membrane to borehole fluid 14 and thereafter to surrounding formation 10. The membrane will of course be sealingly engaged to the wall of housing 60 by any convenient means such as metal clips so as to prevent seepage of borehole fluid 14 into the interstices of housing 60.

Lower base 64 will have provided on the outer cylindrical surface thereof a lower O-ring retainer groove 83 carrying an O-ring 84 which provides sealing engagement between base 64 and the internal surface of housing 60.

An upper base 76 will be provided within housing 60 having an upper support mandrel 78 connected thereto, and may include an upper O-ring retainer groove 116 which carries an upper O-ring 118 for sealing engagement between the outer cylindrical periphery of upper base 76 and the inner surface of housing 60. A plurality of assembly bolts 70, 71, 72 and 73 will extend longitudinally from upper base 76 to lower base 64, each such bolt 70-73 having a respective threaded end 70A, B, C, and D threadedly received by a mating threaded recess 64A, B, C, and D, respectively, in base 64.

It will be understood that an inner volume 124 will thus be provided which is sealed off from the outside of housing 60 and from areas above and below bases 64 and 76, respectively. This volume will preferably contain a material such as hard rubber to provide damping and to support a rod assembly in correct alignment to be described next.

Still referring to FIG. 2A, a rod assembly will be seen depicted in the volume 124 just described, comprised of first and second rods 66 and 68, respectively, about which are disposed corresponding first and second electrical coils 86 and 88, respectively. Acoustic radiators 102 and 106 are attached to opposite ends of rod 66. Acoustic radiators 104 and 108 are attached to opposite ends of rod 68. Finally, extending radially outward from radiators 102-108 and inward from sheeting 61A-D, a rubber ring 138 is provided (more clearly shown in FIG. 4).

Figure 2B:
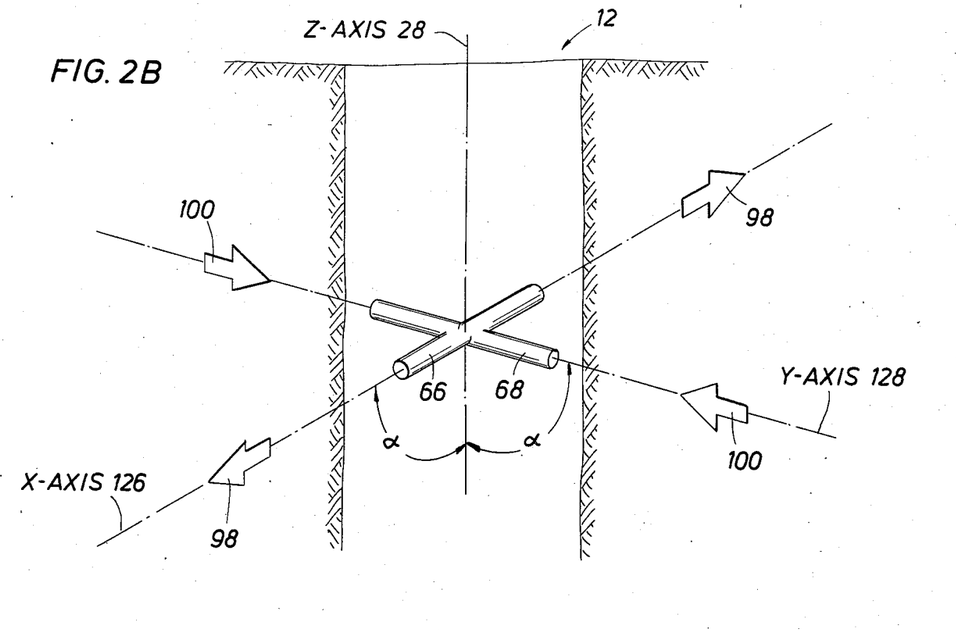
FIG. 2B is a pictorial view of a portion of the logging source illustrated in FIG. 2A.

In FIG. 2A and FIG. 2B (which illustrates a portion of the source of FIG. 2A), an X and a Y axis, 126 and 128, respectively, have been illustrated perpendicular to each other and intersecting central axis 28 for facilitating the detailed description which follows.

Rod 66 is joined at its mid-point to the mid-point of rod 68 by welding or the like to form a cross-shape and the intersection or joint thereby formed will further preferably be oriented so as to intersect central axis 28, thereby disposing the rods centrally within housing 60.

From FIGS. 2A and 2B, it will further be apparent that rod 66 will extend longitudinally along X axis 126 which, in turn, will extend through diametrically opposed windows 27A and 27C (not shown in FIGS. 2A and 2B). Similarly, rod 68 will extend longitudinally along Y axis 128 which extends through diameterically opposed windows 27B and 27D (not shown in FIGS. 2A and 2B). Moreover, axes 126, 128, and 28 will be seen to be mutually perpendicular, e.g., axes 126 and 128 are perpendicular to each other as well as to axis 28.

Each rod 66 or 68 will have two radially outermost ends. The first rod 66 will have a pair of first acoustic radiators 102 and 106, each attached by a spot weld or the like to a different one of the two ends of rod 66. Similarly, second rod 68 will have a pair of second acoustic radiators 104 and 108 each attached to a different end of rod 68.

Referring now to FIG. 2B, only the rods 66 and 68 of the present invention have been shown to more clearly illustrate the operation of the acoustic source of FIG. 2A. If first rod 66 is made to lengthen in the direction of its longitudinal axis 126 during a first time interval, it may be appreciated that an increased (positive) acoustic pressure will result at the ends thereof so that a positive pressure wave will be transmitted in the direction of each of arrows 98.

If, simultaneously during the same first time interval, second rod 68 is made to shorten in the direction of its longitudinal axis 128, a decreased (negative) pressure will result at the ends thereof so that a negative pressure wave will be transmitted in the direction opposite each of arrows 100.

Conversely, if during a successive second time interval rods 66 and 68 shorten and lengthen, respectively, the amplitude of each pressure wave transmitted in the directions of arrows 98 and the directions opposite arrows 100 will reverse. Moreover, if the foregoing two situations are rapidly repeated, it will be understood that first periodic acoustic pressure waves may be formed propagating outwards from the ends of rod 66 in the direction of arrows 98 along axis 126, as well as second periodic acoustic pressure waves propagating radially outward along axis 128. Moreover, these first and second periodic pressure waves will be seen to be out of phase to any desired degree, and preferably 180° out of phase.

It will be appreciated from the foregoing that respective first and second radiator pairs 102, 104 and 106, 108 have been omitted from FIG. 2B for clarity. However, inasmuch as they are interconnected to respective ends of rods 66 and 68, it will further be noted that the aforementioned respective first and second acoustic pressure waves will actually propagate radially outward from the outer surfaces of radiators 102-108 through the rubber in space 124, through ring 138, and respective membranes 61A-D and windows 27A-D into formation 10.

Figure 4:
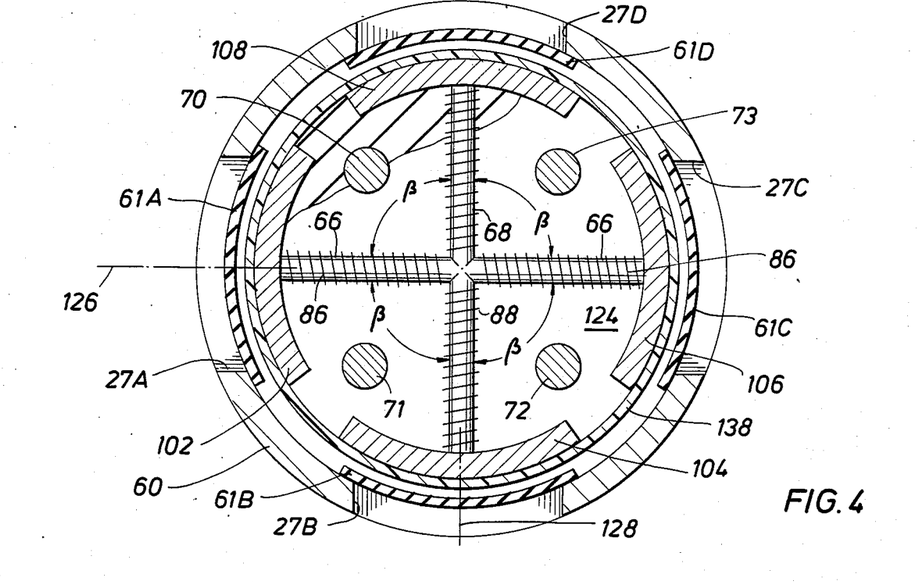
FIG. 4 is a plan view in cross-section of the logging source of FIG. 2A taken along line 4—4.

Still referring to FIG. 2B, a plurality of angles $\alpha$ are therein depicted defining the angles formed by axes 126 or 128 and the central axis 28. Similarly as shown in FIG. 4, a plurality of angles $\beta$ are depicted defining the angles formed by intersection of axes 126 and 128. Although in the embodiment of the present invention just described, these angles $\alpha$ and $\beta$ will all equal 90°, it is specifically contemplated by the invention that this need not be the case.

For example, it has been found that formation of the desired shear or "S" waves in formation 10 may be enhanced by causing the main lobes of the aforementioned first and second acoustic pressure waves to be propagated into formation 10 not at right angles to the borehole wall (as depicted in FIG. 2B along axes 126 and 128) but rather at an offset angle, wherein they will be directed outward at an acute angle with respect to central axis 28. In this manner, conversion of the compressional waves created in borehole fluid 14 to acoustic shear waves in formation 10 may be enhanced preferentially relative to the formation of acoustic compressional waves. Thus, the angle $\alpha$ may desirably be adjusted, the optimum angle $\alpha$ in a given context being a function of the formation characteristics and the desired ratio of acoustic shear wave energy to acoustic compressional wave energy propagating in formation 10.

Accordingly, the center point corresponding to intersection of axes 126, 128, and 28 and rods 66 and 68 may be moved upwards along axis 28, and rods 66 and 68 appropriately effectively bent, so that the outer ends of rods 66 and 68 (and the radiators 102-108 attached thereto) will face a more downwardly direction. In such embodiment, it will be noted that each rod 66 and 68 will be formed of two sections on either side of the center point, each with its own respective longitudinal axis pointing downwards at angles $\alpha$ with respect to central axis 28 so as to define a four sided pyramid. The foregoing will be discussed below in greater detail with respect to an exemplary alternate embodiment.

Figure 3:
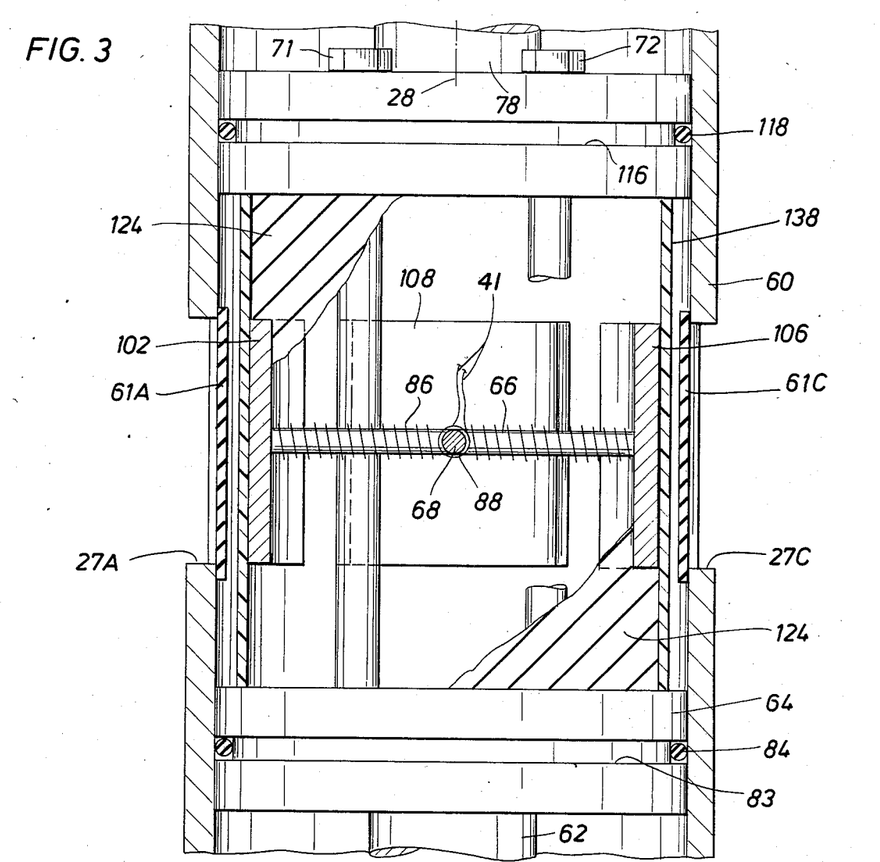
FIG. 3 is an elevational view, in cross-section, of the logging source of FIG. 2A taken on a plane which includes the longitudinal central axis common to the logging sonde depicted in FIG. 1 and the logging source of FIG. 2A contained therein.

As aforementioned, FIGS. 3 and 4 are simply elevational and plan views of the source of FIG. 2A. It will be noted therein that coil leads 41 will be seen extending from coils 86 and 88 which, although not shown, may extend through sonde 16 to a source of electrical power at the surface delivered as shown in FIG. 1 by line 40.

FIG. 5 is a pictorial view of rods 66 and 68 and corresponding coils 86 and 88 of the logging source of FIG. 2A, intended to depict functionally the electrical connection thereof and their configuration in more detail. In the embodiment of FIG. 5, first and second coils 86 and 88 may be seen to be wired in series. However, in the alternative, they may also be wired in parallel.

In the preferred embodiment of the present invention, rods 66 and 68 are each constructed of a ferromagnetic material exhibiting the property known as the magnetostrictive phenomenon whereby when a magnetic field is applied to the material, corresponding changes in length of the material in the direction of the applied field are produced. Accordingly, this is one means whereby the hereinbefore described changes in length of rods 66 and 68 may be achieved.

The magnitude of the changes and whether the material expands or contracts upon magnetization is a function of the particular magnetostrictive material. Thus, various materials exhibit differing material strain constants (changes in length per unit length due to magnetostriction), which may be either positive or negative (indicating the material lengthens or shortens with magnetization, respectively). Moreover, such constants may be either large or small (indicating larger or smaller percentage changes in length for a given magnetic field strength, respectively).

With reference to the embodiment shown in FIG. 2A, it will be understood that the magnetostrictive phenomenon just described may be utilized to construct a magnetostrictive vibrator capable of generating the desired acoustic pressure waves. More particularly, in the embodiment of FIG. 2A, rod 66 will desirably be constructed of a ferromagnetic material known as 2 V Permendur having a positive strain constant, whereas rod 68 may be made of a ferromagnetic material such as nickel having a negative strain constant with an absolute value less than that of 2V Permendur.

From the foregoing, with further reference to FIG. 5, it will be noted that upon application of a magnetic field to rods 66 and 68 by closing switch 42, and thereby energizing corresponding coils 86 and 88 from electrical energy source 132, the outer ends of the rod 66 will move outwards as the rod 66 lengthens in the direction of axis 126 and arrow 98 due to the positive first strain constant of rod 66. Similarly, the outer ends of rod 68 will move radially inward in the direction of arrows 100 along axis 128 due to the rod 68 having a second strain constant which is negative.

Upon opening the switch 42 and thereby de-energizing coils 86 and 88, rods 66 and 68 will return to their normal length. Accordingly, by varying the strength of the applied magnetic field, as, for example, by rapid opening and closure of switch 42, end surfaces of rods 66 and 68 will vibrate (or oscillate) out of phase in the desired manner thereby creating the aforementioned first and second acoustic waves traveling generally horizontally outward toward formation 10 along the respective axes 126 and 128 of rods 66 and 68.

Due to the absolute value of the strain constant for 2V Permendur being larger than that of nickel, for a given magnetic field strength, the amplitude of vibration of the rod 66 would be larger than that of rod 68. Accordingly, in the embodiment of FIG. 2A just described, the number of turns of coil 88 may be made greater than those of coil 86 in order to produce vibrations of approximately equal amplitude, which is desirable in order that the source generate four pressure waves which will interfere in formation 10 to produce acoustic quadrupole waves in formation 10.

Generally, some of the rods used in constructing a source according to the present invention will have a first strain constant and some will have a second strain constant whose absolute value differs from that of the first strain constant. For example, the absolute value of the strain constant of nickel is about half of that of 2V Permendur. Another way to match the effective strain constants of the rod materials used is to wrap the rods having larger absolute strain constant with an electrically conducting metal element (which may be a wire) so that the metal element is wrapped between each such rod and the corresponding surrounding energizing coil which produces the magnetic field at the rod. This wrap will shield the rod from the magnetic field, thus reducing the effective strain constant of the wrapped rod. To illustrate this technique, in a source having some nickel and some 2V Permendur rods, a thin aluminum wire wrap around each 2V Permendur rod will achieve the desired effect of matching the strain constants of the rods.

ALTERNATE EMBODIMENTS

Figure 6:
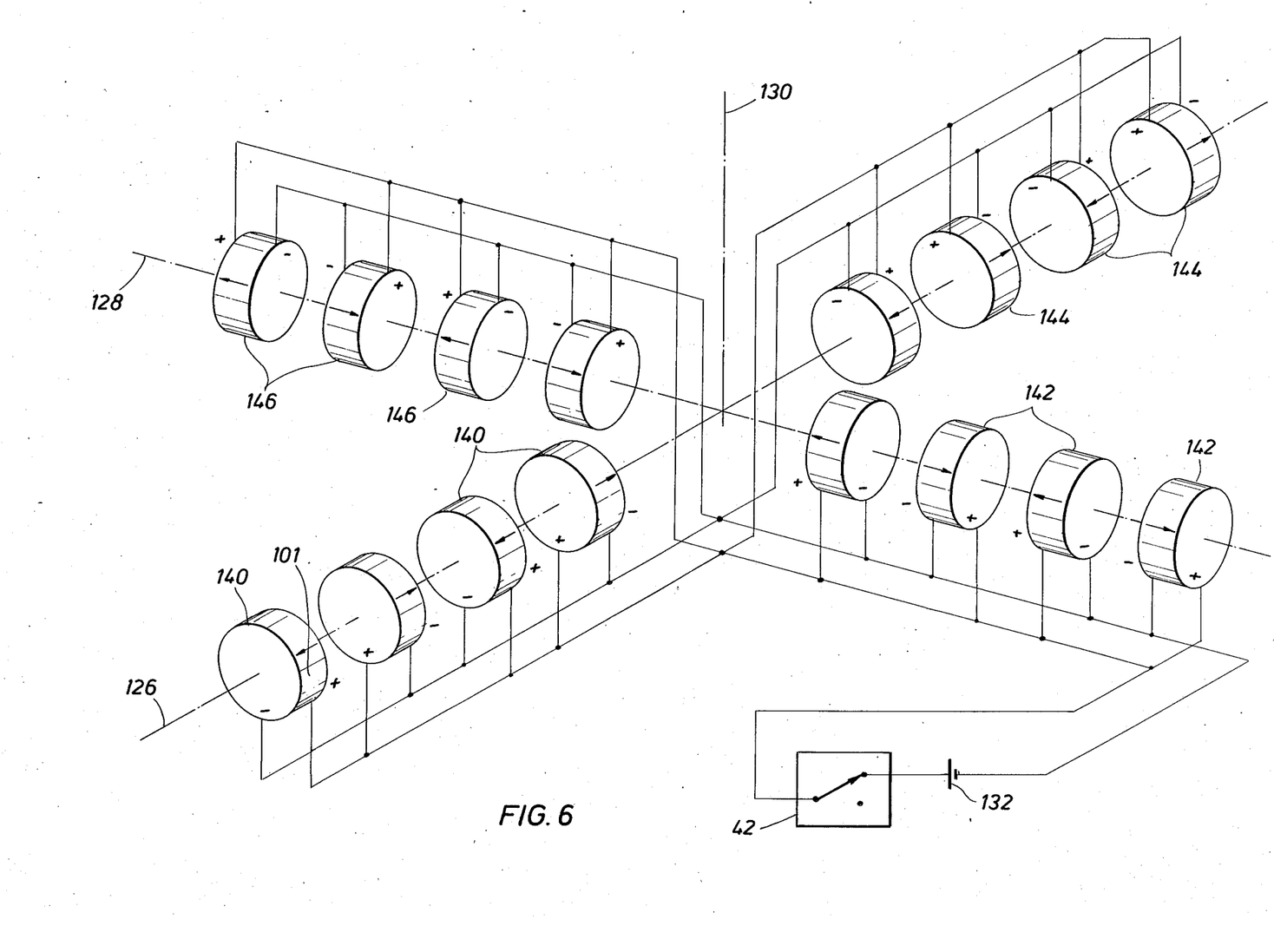
FIG. 6 is a pictorial view of an alternate embodiment of the rod elements of the logging source of FIG. 2A illustrating schematically the electrical wiring thereof.
Figure 7:
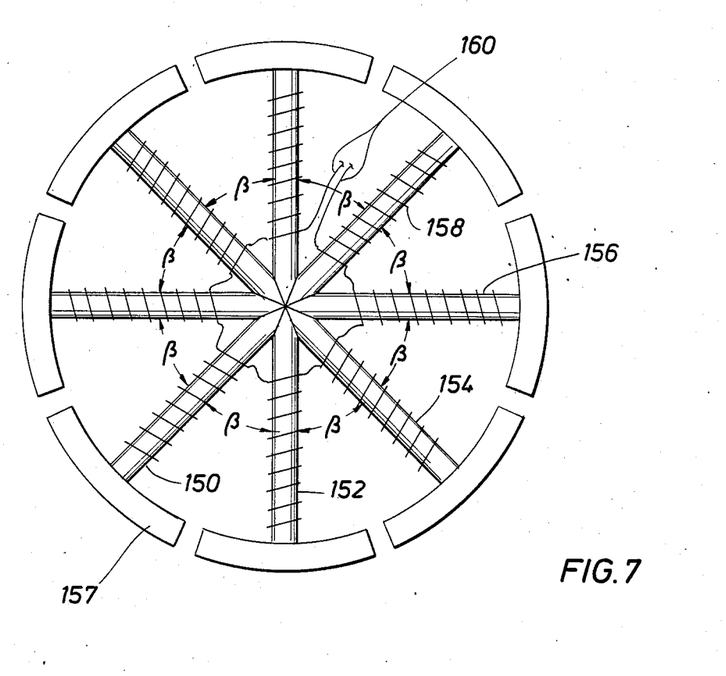
FIG. 7 is a plan view in cross-section of a 16-pole shear wave logging source illustrating an alternate embodiment of the logging source of FIG. 4.

FIGS. 6 and 7 correspond to FIGS. 5 and 4, respectively, in that they depict similar views of alternate embodiments of the present invention. Specifically, with respect to corresponding FIGS. 7 and 4, whereas the preceeding description of the present invention has been limited to an acoustic quadrupole wave generator or source, the invention is not intended to be so limited and fully contemplates other embodiments.

More particularly, in accordance with the references cited herein, the present invention fully contemplates the desirability, in some applications, of the construction and use of multipole acoustic wave sources of a variety of designs using one or more rods vibrating along their longitudinal axes, each such rod being arranged so that it is substantially transverse to the central axis 28.

Thus, for example, there may be constructed with one rod a dipole source (to be hereinafter described with reference to FIGS. 9A and 9B). With two rods, a quadrupole source (previously described) may be constructed, with three rods an octopole source, with four rods a 16-pole source (to be hereinafter described with respect to FIG. 7) may be constructed, and so on.

In the general case, a multipole source of order N, where N=1, 2, 3, and so on indefinitely may be denoted as a $2^N$-pole source, wherein N=1, 2, 3, and 4, for a dipole, quadrupole, octopole, and 16-pole source, respectively, for example. It will also be noted that the number of end radiator surfaces utilized to construct a $2^N$-pole source will be 2N, e.g., there will be 2, 4, 6, and 8 radiators attached to a corresponding number of rod ends for the dipole, quadrupole, octopole and 16-pole sources, respectively. Furthermore, the angle $\beta$ between the projection of adjacent rod ends on a plane normal to central axis 28 will preferably be 360°/(2N). Such adjacent rod ends will produce pressure waves which are substantially 180° out of phase with respect to each other.

General illustration of the progressively higher order multipole sources contemplated by the present invention may be seen from the following table:

| N = | Order of Source | Number of Radiators (and Lobes) | $\beta = \frac{360}{2N}$ | Number of Rods N |
|---|---|---|---|---|
| 1 | 2 (Dipole) | 2 | 180 | 1 |
| 2 | 4 (Quadrupole) | 4 | 90 | 2 |
| 3 | 8 (Octopole) | 6 | 60 | 3 |
| 4 | 16 (16-Pole) | 8 | 45 | 4 |
| 5 | 32 (32-Pole) | 10 | 36 | 5 |
| . | . | . | . | . |
| N | $2^N(2^N\text{-Pole})$ | $2 \times N$ | $\frac{360}{2N}$ | N |

It will be noted that with respect to some of the multipole acoustic sources described herein, modification of the rod construction may be required. For example, for the octopole, three rods are required. However, if a given rod is made entirely of one magnetostrictive material the constraint that the adjacent rod ends be 180° out-of-phase could not be met inasmuch as two of the rods would be of the same material with adjacent ends in phase.

Thus, rather than constructing sources wherein the entire rod is an integral piece of one material, to accommodate multipole sources wherein the abovedescribed situation arises (as well as in construction of the other sources herein described), it is contemplated that half rods or sections may be employed. In this construction, the half rods or sections may be welded to the mandrel (such as mandrel 202 of FIG. 8) to form spoke-like projections extending radially outward. These spokes will alternate in composition between first and second magnetostrictive materials (having respectively, positive and negative strain constants) as one progresses in circular fashion about central axis 28.

Alternately, each section or half rod may be comprised of alternating piezoelectric stacked disc arrays which alternate in polarity so as to achieve the desired 180° phase relationship between a given half rod and those adjacent thereto on either side.

In a manner to be described in greater detail with respect to the 16-pole source as a specific example, when more than one rod is utilized to form a multipole source of the present invention, the rods will preferably be arranged so that they are all joined at the mid-points of their longitudinal axes, such mid-points intersecting central axis 28 so as to cause the rod assembly to appear like spokes of a wheel extending radially outward from central axis 28.

Preferably, each "spoke" forms the aforementioned equal angles $\beta$ and $\alpha$ with respect to adjacent spokes and central axis 28, respectively, whereby $\beta = 360°/(2 \times N)$, and where $\alpha$ may be equal to or less than 90° as previously noted. It will be recalled that $\alpha$ may be selected as a function of formation characteristics and the like, and will be less than 90° to enhance formation of multipole acoustic shear waves in the formation surrounding the borehole.

Still referring to the general case before discussing alternate specific embodiments other than the quadrupole source of FIG. 2A (such as the dipole and 16-pole sources to be described below), in the case where more than one rod is employed, the rod sections (or spokes) will preferably alternate in composition from the aforementioned first magnetostrictive material having positive strain constant to the second material having negative strain constant to the first material, and so on as one progresses around the central axis 28 in a circular path.

Finally, with respect to the general case, the radially outwardmost end of each section or spoke comprising each rod will have attached thereto an acoustic radiator in a manner similar to that described with reference to FIG. 2A. Each spoke will also have an electrical coil disposed thereabouts, also in like manner to that of the source of FIG. 2A. Thus, when the coils of the particular rod source are energized, they will vibrate also in like manner to those of FIG. 2A. Each spoke will thus generate a respective acoustic pressure wave traveling radially outwards along its longitudinal axis, each such wave being out of phase with respect to the pressure wave generated by the adjacent-most spoke on either side thereof, such waves propagating from the acoustic radiators disposed on the ends of the spokes. Moreover, a radiation pattern plot of a source constructed in accordance with the hereinbefore noted description would reveal the source would provide 2N lobes, each propagating outwards from a different respective acoustic radiator.

Accordingly, referring now to FIG. 7 for an illustrative example of a 16-pole source, in comparison to the quadrupole source of FIG. 4, it may be appreciated that instead of only two rods 66 and 68, four rods 150, 152, 154 and 156 are provided (with corresponding coils such as coil 158 terminating in coil lead 160 similar to lead 46) as well as eight corresponding windows radially outwards from the rods (not shown) and eight radiators such as radiator 157 each disposed on a different outer end of rods 150–156.

In similar manner to the embodiment of FIGS. 1–5, the four rods 150–156 will be oriented so that their radially outermost ends are evenly spaced about the circumference of a circle having central axis 28 as its center and lying in a plane substantially perpendicular to axis 28. Similarly, the rods will alternate between a first and second ferromagnetic material as we traverse the circle having respective strain constants alternating in sign. Finally, the rods may be energized in a manner similar to that functionally depicted in FIG. 5. It will thus be understood that in the embodiment of FIG. 7, instead of four pressure waves being produced which travel outwards from the sonde 16, eight such waves will be produced.

Referring now to FIG. 6, yet another embodiment of the present invention may be seen depicted therein. More particularly, FIG. 6 depicts an alternative method of constructing the vibrating rods 66-68 or 150-156 utilized in the embodiments of the acoustic wave source illustrated in FIGS. 2A or 7, respectively.

Each magnetostrictive rod and coil such as rod 66 and coil 86 of FIG. 2A may have substituted therefor a piezoelectric rod such as the four rods shown in FIG. 6 in exploded view.

Each rod of FIG. 6 will be seen to be comprised of a plurality of polarized discs such as discs 140, 142, 144, and 146 fashioned from a suitable piezoelectric crystal material, such as that commercially supplied by the Vernitron Company of Bedford, Ohio. These discs will be stacked and coaxially aligned along respective axes 126 or 128. These axes will be seen to correspond to longitudinal axes of previously described rods 66 and 68 extending perpendicularly with respect to each other and with respect to central axis 28.

Piezoelectric crystals have the property that they will either expand or contract in response to an applied electrical potential, and whether the crystal expands or contracts is controllable by the direction of the applied potential.

Accordingly, with the crystal discs 140-146 polarized in the indicated directions, stacked, and wired as depicted in FIG. 6, it will be understood that because wiring of stacks aligned along axis 126 is opposite to those aligned along axis 128, upon energization of all stacks from energy source 132 by closing switch 42, the discs 140 and 144 will expand longitudinally in the direction of axis 126, whereas remaining sets of discs 142 and 146 will contract along axis 128, thus achieving the desired generation of two sets of out-of-phase acoustic waves previously described with respect to the embodiment of FIG. 2A propagating radially outward into formation 10 in four different directions.

It will be noted that just as discs 140, 144, and 142, 146 may be substituted for rods 66 and 68, respectively, similar stacks of discs may be substituted for the rods of any multiple rod assembly constructed in accordance with the teachings of the present invention.

However, as with those of FIG. 6, the polarity and wiring of each disc-stack will alternate with respect to the adjacent-most disc-stack on either side thereof (in like manner to the adjacent magnetostrictive rods alternating in strain constant sign) in order to achieve the desired out of phase acoustic wave generation previously discussed.

Figure 8:
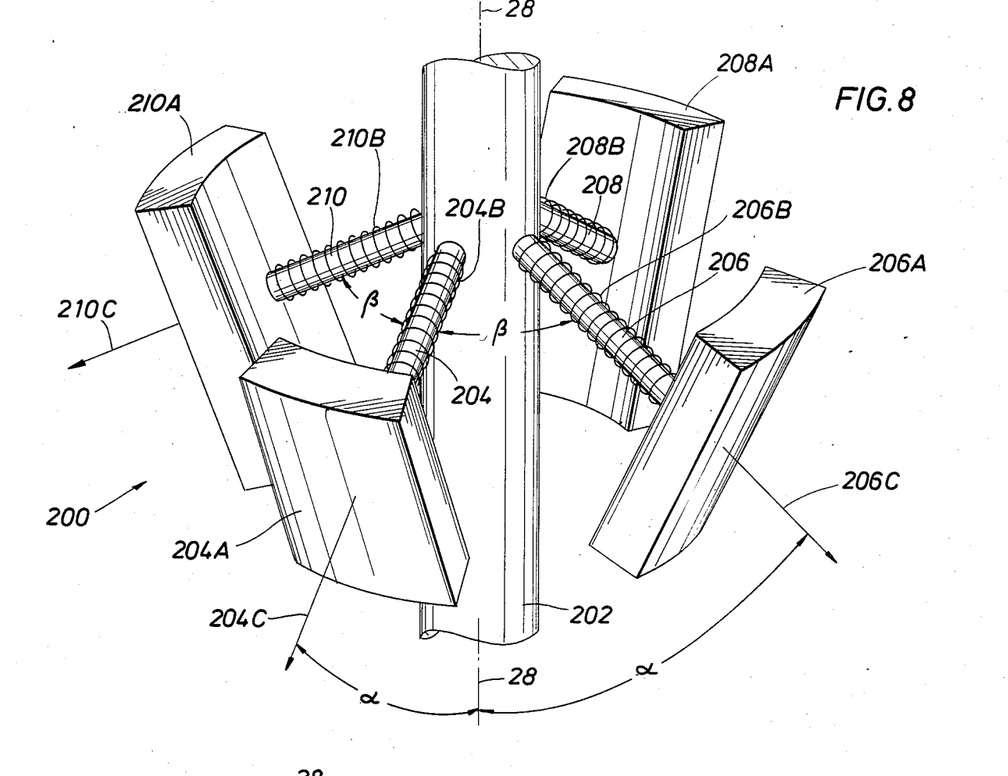
FIG. 8 is a pictorial view of another alternate embodiment of the present invention.

Referring now to FIG. 8, an alternate embodiment 200 of the quadrupole shear wave source of FIG. 2A will be seen depicted therein, greatly simplified by elimination of the housing 60 and the like for clarity. A mandrel 202 will be provided in the housing 60 (not shown) coaxial to central axis 28 which, in effect, is equivalent functionally to an extension of mandrels 62 and 78 of FIG. 2A whereby they form one integral piece comprising mandrel 202. Disposed radially outward from mandrel 202 are four rod sections 204, 206, 208, and 210. The projections of each such rod section on a plane normal to central axis 28 are substantially evenly spaced at substantially equal angles $\beta$. Each such rod 204-210 will have attached at its radially outward-most end a corresponding acoustic reflector 204A, 206A, 208A, and 210A, respectively, such reflectors 204A-210A being substantially identical in construction and purpose to radiators 102-108 of FIG. 2A. Also, in similar manner, each such rod 204-210 will have disposed thereabout a corresponding coil 204B, 206B, 208B, and 210B, also for like purposes to those coils 86 and 88 of FIG. 2A.

Diametrically opposed rods 204 and 208 will be comprised of a first magnetostrictive material and rods 206 and 210 of the second magnetostrictive material having a strain constant differing in sign from that of rods 204 and 208, also for purposes hereinbefore noted.

The fundamental difference between the embodiment depicted in FIG. 8 from that of FIG. 2A is that the longitudinal axes of rods 204-210, rather than extending in a plane perpendicular to central axis 28 (as in the case of the embodiment of FIG. 2A), extend in a generally downward direction toward detectors 25, forming an angle $\alpha$ with respect to central axis 28. As noted in the references cited, it has been found that by appropriately selecting the angle $\alpha$ (and hence the direction of acoustic waves from radiators such as 204A-210A) as a function of formation characteristics and the like, the formation of acoustic shear waves in formation 10 may be enhanced preferentially relative to the formation of acoustic compressional waves. Accordingly, in the embodiment depicted in FIG. 8, this phenomenon is taken advantage of specifically in the design, whereby the longitudinal central axes 204C-210C of corresponding respective rods 204-210 are aligned in a generally downward direction. This causes their respective radiators 204A-210A to, in like manner, have their radiating faces directed in a generally downward direction so as to cause the acoustic waves propagating from the radially outward surfaces thereof to do so in the direction of the arrows indicated on axes 204C-210C.

It should be recognized with reference to FIG. 1, that at the interface between borehole fluid 14 and formation 10, not only will a portion of the compressional wave energy propagating in borehole fluid 14 away from source 26 (in the embodiment of FIG. 2A or the embodiment of FIG. 8) be converted to acoustic shear wave energy which will propagate in formation 10, but another portion of such compressional wave energy in fluid 14 will be converted to acoustic compressional wave energy which will also propagate in formation 10. The shear waves induced in formation 10 will interfere to produce a quadrupole shear wave in formation 10. Similarly the compressional waves induced in formation 10 will interfere to produce a quadrupole compressional wave in formation 10. The ratio of quadrupole shear wave energy to quadrupole compressional wave energy produced by source 26 in formation 10 will depend on the aforementioned angle at which the pressure waves in fluid 14 are incident at the interface between fluid 14 and formation 10 and will also depend on the source frequency.

For direct acoustic shear wave logging, it is desirable to enhance generation of shear waves in formation 10 relative to generation of compressional waves therein. This may be accomplished in the manner described in the paragraph immediately preceding the above paragraph. In contrast, for efficient acoustic compressional wave logging it may be desirable to enhance generation of compressional waves in formation 10 relative to generation of shear waves therein.

Source 26, operated in the same mode described herein with reference to quadrupole shear wave logging, may be used for performing quadrupole compressional wave logging. The quadrupole compressional wave arrival at the detectors will occur prior to the quadrupole shear wave arrival at the detectors, so that the concurrent generation of quadrupole shear waves in formation 10 (with the quadrupole compressional waves of interest in quadrupole compressional wave logging) will not hinder compressional wave logging operations. To efficiently perform quadrupole acoustic compressional wave logging using embodiment 200 (shown in FIG. 8) of source 26, it is desirable that the angle of incline of rods 204-210 relative to central axis 28 be adjusted so that the rod axes are substantially normal to central axis 28, so that generation of compressional waves in formation 10 is enhanced relative to generation of shear waves therein.

It will be apparent to those ordinarily skilled in the art that the dipole, octopole, and other embodiments of the acoustic source of the present invention are similarly suitable for either multipole acoustic shear wave logging or for multipole acoustic compressional wave logging.

It will be appreciated that whereas the generally downwardly directed rods and corresponding radiators have been depicted only with respect to the quadrupole source of FIG. 8, this concept may be beneficially adapted to any of the multipole sources of the present invention described herein, regardless of the number of rods comprising the sources or whether the sources are comprised of a magnetostrictive or piezoelectric material.

Figures 9A, 9B:
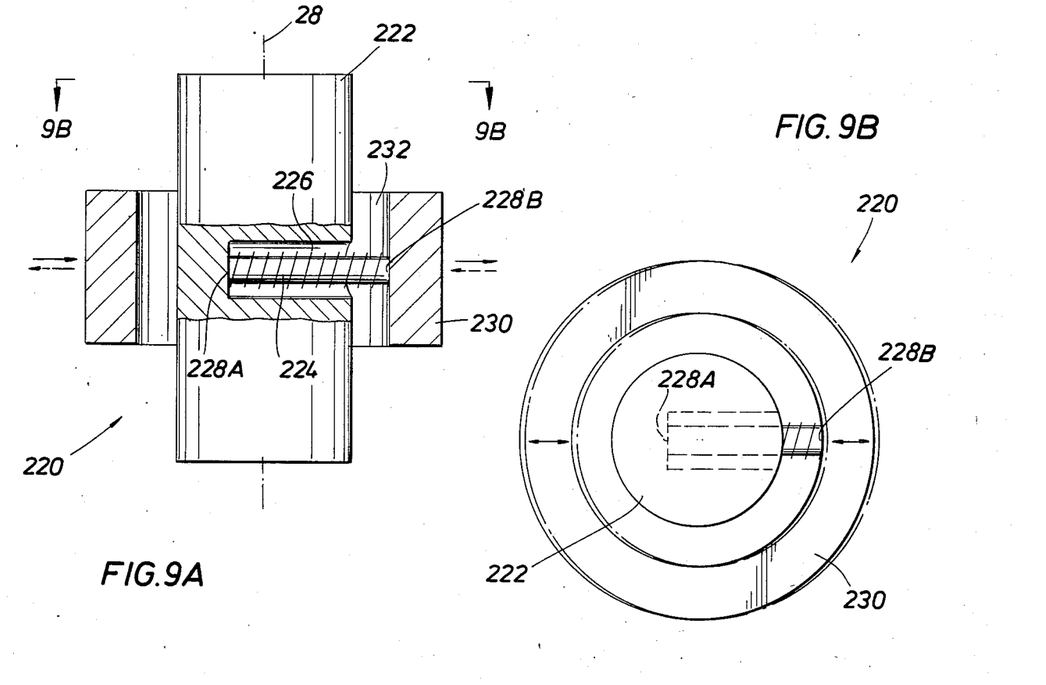
FIG. 9A is an elevational view of still another alternate embodiment of the present invention.
FIG. 9B is a plan view of the alternate embodiment of the present invention depicted in FIG. 9A.

Referring now to FIG. 9A, there will be seen depicted therein yet another embodiment 220 of the present invention comprising a dipole acoustic wave source. As with the embodiment of FIG. 8, a mandrel 222 is provided coaxial with the central axis 28 which defines a transverse aperture therethrough having disposed therein a rod 224. The rod is carried by the mandrel 222 by means of a tack weld 228a or the like between the rod 224 and the inner surface of the mandrel 222 defining a portion of the aperture. Rod 224 preferably will be comprised of magnetostrictive material as previously described with reference to other similar rods and, also in like manner, preferably will have an electrical coil 226 disposed thereabout. Alternatively, rod 224 will be comprised of piezoelectric material as are the disc-stacks discussed above with reference to FIG. 6. The radially outwardmost end of rod 224 will be attached by means of a tack weld 228b or the like, to cylindrical acoustic radiator 230. The length of rod 224 is preselected preferably so as to align cylinder 230 to be in coaxial relation with mandrel 222 and central axis 28 when source 220 is in its quiescent state.

Further, it will be noted that the inside diameter of cylinder 230 will preferably be selected with respect to the outside diameter of mandrel 222 so that the outer and inner surfaces of mandrel 222 and cylinder 230, respectively, define annular region 232.

Referring now to FIG. 9B, which is a top view of source 220 of FIG. 9A, cylinder 230 will be seen depicted therein in coaxial alignment with central axis 28 and will also be seen depicted in phantom as being displaced along axis 126 so as to no longer be in coaxial alignment with central axis 28. Upon energization of the coil 226 disposed about rod 224, it will be appreciated that rod 224 will change length or vibrate along its longitudinal axis 126. Inasmuch as the inner and outer ends of rod 224 are interconnected to mandrel 222 and cylinder 230 by means of welds 228a and 228b, or the like, any such longitudinal motion of rod 224 will be transmitted to cylinder 230, thereby causing cylinder 230 to oscillate from an alignment coaxial to central axis 28 to an alignment depicted in phantom. Such motion of cylinder 230, which is an acoustic radiator of similar material and construction to those previously described, will cause the generation of a first acoustic pressure wave traveling to the left in FIG. 9B along axis 126, and simultaneously a second acoustic pressure wave propagating in the general direction to the right in FIG. 9B along axis 126. Moreover, the main lobes of such pressure waves traveling in the direction of the arrows will be 180° out of phase with each other, thereby creating the desired dipole radiation pattern of the source of the embodiment 220 of FIGS. 9A and 9B.

Yet another alternate construction may be desired for the aforementioned higher order sources (such as the octopole) wherein the full rods of alternating magnetostrictive material will not produce the desired 180° phase relationship between adjacent rod ends.

In this alternate construction, two N sided regular polygons may be constructed and aligned substantially parallel with respect to each other, coaxially about central axis 28, and angularly displaced with respect to central axis 28 relative to each other by the angle β. All sides of one of the polygons will be constructed of a first magnetostrictive material having positive strain constant and those of the second polygon of the second magnetostrictive material having negative strain constant.

Thus, for example, to construct an octopole source of this general type, two equilateral triangles will be arranged which are angularly displaced about axis 28 by 60° relative to each other to form a six-pointed star shape. When coils about the sides of the triangles are energized, one triangle will expand while the other contracts, and vice-versa during a next time interval. With acoustic radiators attached to each apex of each triangle facing radially outward away from axis 28, it will be appreciated that a main lobe of acoustic energy will propagate from each of the six apexes of the two triangles, each lobe being 180° out-of-phase from those adjacent thereto on either side.

It is possible to build acoustic sources in accordance with the teachings of the present invention which may generate extremely powerful out-of-phase acoustic pressure waves in the sonde 16 sufficient to easily establish strong dipole, quadrupole or higher order shear waves in the formation of interest. The desired frequency $\omega_q$ of the acoustic waves to be generated will govern choice of the particular parameters of rods such as 66-68, stacks such as 140-146 and radiators such as 102-108. Typical desired frequency ranges of oscillation for the sources described herein will be in the range of just below 3 KHz to 14 KHz or even higher, with frequencies about 3 KHz being often typical for direct quadrupole acoustic shear wave logging in relatively "soft" formations and about 6 KHz or higher for direct quadrupole acoustic shear wave logging in "hard" formations.

More particularly, for a given desired natural source frequency $\omega_q$, wherein the mass M of each radiator, modulus of elasticity E, cross-sectional area A and length L of each rod are equal, and the mass of each rod is small compared to that of its associated radiator, these parameters may be selected according to the relationship $$\omega_q = [(2 \times E \times A)/(M \times L)]^{\frac{1}{2}}.$$

Due to the high strength of acoustic waves which may be generated with the source of the present invention, it has been found that the acoustic waves generated which have frequency equal to the first harmonic of the nominal oscillating frequency of the rods (which first harmonic is also present in the oscillations) may be of sufficient magnitude such that, to accomplish direct quadrupole shear wave logging, the source 26 may be operated for both soft and hard formations at the same nominal oscillating frequency.

Moreover, also due to the strength of the instant source, well-to-well or "cross borehole" logging may even be achieved wherein formation 10 may be acoustically excited at one borehole situs with the source of the present invention and the acoustic signature detected at an adjacent borehole situs.

Because oscillating magnetostrictive rods may be provided which are energized by magnetic fields, relatively small power supply requirements of low voltage are required to energize their respective coils. This is a distinct advantage over conventional piezoelectric vibrating elements which characteristically require higher voltage supplies with attendant noise problems and the like. However, when "stacked array" rods of a piezoelectric disc material are substituted for magnetostrictive rods, as in the case of the alternate embodiment of FIG. 6, these problems may be reduced by careful design.

It will be appreciated that the operating principles of the acoustic wave sources of the invention disclosed herein may be adapted with relatively minor changes to construct acoustic wave detectors, and such detectors are accordingly specifically within the scope and spirit of the subject invention.

For example, with reference to FIG. 2A, it is readily apparent that if the source depicted therein is used as a detector, acoustic waves in borehole fluid 14 be detected will travel opposite to those generated when it is acting as a source. More particularly, acoustic waves will enter through windows 27A–D, etc., so as to be incident on rods 66–68 and radiators 102–108.

The energy impinging upon rods 66–68 will cause vibrations therein which may be used to induce measurable potential signal levels in coils 86–88 functionally related to the acoustic waves.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

I claim:

1. Apparatus for introducing $2^N$ pole acoustic waves into a subsurface earth formation traversed by a borehole having a longitudinal axis, where N is an integer not less than two, including:

a housing having a central longitudinal axis and defining at least one window, said housing being adapted to be disposed in the borehole so that the central longitudinal axis of the housing is substantially parallel to the longitudinal axis of the borehole; and a number of rods disposed within said housing, each rod having a longitudinal axis extending through one of said windows, and each rod being composed of material selected so that the rod changes in length along its longitudinal axis in response to electrical excitation so as to generate acoustic waves within said housing in a manner such that the acoustic waves will propagate toward the formation and be incident at the interface between the borehole and the formation in the direction of the longitudinal axis of the rod, and will thereafter interfere in the formation to produce a $2^N$-pole acoustic wave in the formation.

2. The apparatus of claim 1, including: a first rod having a first length extending in the direction of a first longitudinal axis, which first length changes in response to electrical excitation; and also including a second rod having a second length extending in the direction of a second longitudinal axis, which second length changes in response to electrical excitation.

3. The apparatus of claim 1, including: a first rod having a first length extending in the direction of a first longitudinal axis, which first length changes in response to said electrical excitation, wherein a first end of the first rod is fixedly attached to the housing; and also including a ring-shaped acoustic radiator attached to the other end of the first rod in coaxial alignment with the central longitudinal axis of he housing, wherein upon electrical excitation of the first rod, the radiator will undergo oscillating motion perpendicular to the central longitudinal axis of the housing, producing acoustic waves which will interfere in the formation to produce a dipole acoustic wave in the formation.

4. The apparatus of claim 1, including a first rod having a first section and a second section, each of said first and second sections having an outer and inner end, said inner ends of said first and second sections being interconnected and wherein each of said first and second sections has a longitudinal axis extending through one of said at least one windows.

5. The apparatus of claim 4, wherein the longitudinal axis of said first section of said first rod and longitudinal axis of said second section of said first rod are colinear.

6. The apparatus of claim 4, also including a second rod having a first section and a second section, each of said first and second sections of said second rod having an outer and an inner end, said inner ends of said first and second sections of said second rod being interconnected to said inner ends of said first and second sections of said first rod and wherein each of said first and second sections of said second rod has a longitudinal axis extending through one of said at least one windows.

7. The apparatus of claim 6, wherein the longitudinal axis of said first section of said second rod and the longitudinal axis of said second section of said second rod are colinear.

8. The apparatus of claim 6, also including first acoustic radiators each connected to a different one of said outer ends of said first and second sections of said first rod, each of said first radiators being disposed between a respective one of said outer ends of said first rod and the one of said at least one windows through which the longitudinal axis associated with said respective one of said outer ends of said first rod extends.

9. The apparatus of claim 8, also including second acoustic radiators each connected to a different one of said outer ends of said first and second sections of said second rod, each of said second radiators being disposed between a respective one of said outer ends of said second rod and the one of said at least one window through which the longitudinal axis associated with said respective one of said outer ends of said second rod extends.

10. The apparatus of claim 9, wherein said first and second rods each have a substantially equal modulus of elasticity E, cross-sectional area A, and length L, and are co-planar, wherein the mass of each of said first and second radiators is equal to M, and wherein said M, E, A, and L are selected from a pre-selected frequency $\omega_q$ of said first and second pressure waves according to the relationship $$\omega_q = [(2 \times E \times A)/(M \times L)]^{\frac{1}{2}}.$$

11. The apparatus of claim 9, wherein, in response to said electrical excitation, said outer ends of said first and second rods vibrate in the direction of said longitudinal axis of said first and second rods, respectively, so that the length of said first rod and the length of said second rod both change with respect to time.

12. The apparatus of claim 11, wherein said length changes in said first rod are substantially 180° out of phase with said length changes of said second rod, and wherein said length changes in said first and second rods are transmitted to said first and second radiators connected to said outer ends of said first and second rods, respectively, so that said first radiators generate first acoustic pressure waves propagating outward from said first radiators, said second radiators generate second acoustic pressure waves propagating outward from said second radiators, and said first and second pressure waves are substantially 180° out of phase.

13. The apparatus of claim 9, wherein the projection of said first rod on a first plane perpendicular to the central axis is perpendicular to the projection of said second rod on said first plane.

14. The apparatus of claim 13, wherein each said longitudinal axis of each one of said first and second sections of said first and second rods defines with the central axis of said housing an angle of less than 90°.

15. The apparatus of claim 1, wherein each rod is comprised of a piezoelectric material.

16. Acoustic apparatus for generating a $2^N$-pole acoustic wave in a formation traversed by a borehole, where N is an integer not less than two, including:
   a hollow housing defining a cylindrical inner surface in co-axial alignment with a central longitudinal axis;
   an upper and lower base disposed within said housing in sealing engagement with said inner surface and defining with said inner surface a cylindrical annulus;
   a cross-shaped rod assembly disposed within said annulus comprising:
      a first rod extending in the direction of and in co-axial alignment with a first axis;
      a second rod extending in the direction of and in co-axial alignment with a second axis;
      said first, second, and central axes being substantially mutually perpendicular and intersecting to define a center point of said rod assembly;
      said first rod having opposing ends spaced along said first axis at first distances from and on either side of said center point, and said second rod having opposing ends spaced along said second axis at second distances from and on either side of said center point;
   a plurality of acoustic radiators including first acoustic radiators each diaposed at a different one of said opposing ends of said first rod and second acoustic radiators each disposed at a different one of said opposing ends of said second rod, said first radiators each having a radiating surface lying substantially in a plane perpendicular to and intersecting said first axis, and said second radiators each having a radiating surface lying substantially in a plane perpendicular to and intersecting said second axis;
   said housing defining a plurality of acoustic windows each spaced outwards, with respect to the central axis, from at least one of said first and second radiators;
   a first coil disposed about said first rod in coaxial alignment with said first axis for varying the distance between said ends of said first rod along said first axis in response to electrical excitation of said first coil in such a manner that the relative motion of the ends of the first rod will cause first acoustic waves to propagate away from the first acoustic radiators toward the formation and to be incident at the formation in the direction of the first axis; and
   a second coil disposed about said second rod in coaxial alignment with said second axis for varying the distance between said ends of said second rod along said second axis in response to electrical excitation of said second coil in such a manner that the relative motion of the ends of the second rod will cause second acoustic waves to propagate away from the second acoustic radiators toward the formation and to be incident at the formation in the direction of the second axis, wherein the first acoustic waves and second acoustic waves will interfere in the formation to produce a $2^N$-pole acoustic wave in the formation.

17. A method of generating a dipole acoustic wave in a subsurface earth formation traversed by a borehole having a central axis therethrough, comprising:
   disposing in said borehole a rod having an outer end and a longitudinal axis intersecting said central axis and said outer end, and a ring-shaped acoustic radiator attached to the outer end of the rod in coaxial alignment with the central axis of the borehole, where the rod is composed of material selected so that the length of the rod along its longitudinal axis will vary in response to electrical excitation; and
   electrically exciting the rod so as to vary the length of said at least one rod along its longitudinal axis in a manner so that the acoustic radiator undergoes oscillatory motion perpendicular to the central axis of the borehole, causing acoustic pressure waves to propagate from said acoustic radiator outward into said formation, so that said acoustic waves will be incident at the interface between the borehole and the formation in the direction of said longitudinal axis, and will interfere in the formation to produce a dipole acoustic wave.

18. An acoustic wave generator apparatus for generating a dipole acoustic wave in a formation traversed by a borehole having a longitudinal axis, comprising:
   a mandrel with a central axis, said mandrel defining an outer mandrel surface;
   a ring-shaped acoustic radiator in coaxial alignment with said central axis and disposed about said mandrel and defining an inner radiator surface, said inner and outer surfaces further defining an annulur region therebetween; and a rod, having a longitudinal axis substantially perpendicular to the central axis, and interconnected between said mandrel and said radiator, the length of said rod being variable in response to electrical excitation, so that upon electrical excitation of the rod, the rod will vary in length, producing oscillating movement of said radiator in directions parallel to the longitudinal axis of the rod and transverse to said central axis relative to said mandrel so as to generate acoustic pressure waves which will propagate away from the radiator toward the formation and be incident at the interface between the borehole and formation in directions parallel to the longitudinal axis of the rod, and will interfere in the formation to produce a dipole acoustic wave.

19. The apparatus as defined in claim 18, wherein said rod is comprised of a magnetostrictive material.

20. The apparatus as defined in claim 18, also including an electrical coil disposed about said rod for providing said electrical excitation.

21. The apparatus as defined in claim 18, wherein said rod is comprised of a piezoelectric material.

22. The apparatus as defined in claim 18, wherein said outer surface of said mandrel is cylindrical.

23. An acoustic wave source apparatus having a central axis, for generating $2^N$-pole acoustic waves, where N is an integer not less than two, for use in acoustic well logging of a subsurface earth formation, comprising:

2N rods each having an outer end, and each extending radially outward from a location adjacent the central axis and along a respective longitudinal axis substantially transverse to the central axis, each of said rods being adapted to oscillate along its respective longitudinal axis in response to electrical excitation; and a plurality of acoustic radiators each attached to an outer end of a respective different one of said rods, each said radiator having a respective radiating surface facing radially outward toward said formation for propagating a respective acoustic wave from said each radiator surface into said formation in response to said oscillation of each rod. in such a manner that the pressure waves will be incident at the interface of the wall and the formation in directions parallel to the longitudinal axes of the rods, and will interfere in the formation to produce a $2^N$-pole acoustic wave.

24. The apparatus as defined in claim 23, wherein the projection of each said respective longitudinal axis on a first plane perpendicular to said central axis defines an angle $\beta$ with respect to the projection on the first plane of each different one of said longitudinal axes immediately adjacent to said each respective longitudinal axis, and each said respective longitudinal axis defines an angle $\alpha$ with respect to said central axis.

25. The apparatus as defined in claim 24, wherein $\beta = 360°/(2N)$.

26. The apparatus as defined in claim 25, wherein said oscillation of each of said rods is out-of-phase with respect to oscillation of each different one of said rods immediately adjacent to said each rod.

27. The apparatus as defined in claim 26, wherein said out-of-phase motion is 180° out-of-phase.

* * * * *